US012586966B1

(12) United States Patent
Newell

(10) Patent No.: US 12,586,966 B1
(45) Date of Patent: Mar. 24, 2026

(54) ELECTRICAL CABLE SPLICING DEVICE

(71) Applicant: David Newell, Burton, OH (US)

(72) Inventor: David Newell, Burton, OH (US)

( * ) Notice: Subject to any disclaimer, the term of this patent is extended or adjusted under 35 U.S.C. 154(b) by 294 days.

(21) Appl. No.: 18/229,638

(22) Filed: Aug. 2, 2023

(51) Int. Cl.
*H01R 25/00* (2006.01)
*H01R 4/36* (2006.01)
*H01R 4/70* (2006.01)

(52) U.S. Cl.
CPC ............. *H01R 25/003* (2013.01); *H01R 4/36* (2013.01); *H01R 4/70* (2013.01)

(58) Field of Classification Search
CPC ........... H01R 25/003; H01R 4/36; H01R 4/70
See application file for complete search history.

(56) References Cited

U.S. PATENT DOCUMENTS 4,797,121 A 1/1989 Hayward
5,087,795 A 2/1992 Guginsky
5,917,148 A 6/1999 Woehl et al.
6,422,884 B1 7/2002 Babasick et al.
7,060,900 B1 6/2006 Gretz
7,950,956 B2 * 5/2011 Hiner ........................ H01R 4/70 174/92
2014/0151088 A1 6/2014 Godager
2015/0072574 A1 3/2015 McGann et al.
2016/0156112 A1 * 6/2016 Broughton ............... H01R 4/34 439/142
2018/0248306 A1 8/2018 Franke et al.

FOREIGN PATENT DOCUMENTS

DE 202009015299 U1 * 2/2010 ............... H01R 4/20

OTHER PUBLICATIONS

50mm Electrical Conduit Inspection Tee. Product Listing [online]. Copyright © 2023 Electrotraders [retrieved on Mar. 2, 2023]. Retrieved from the Internet: URL: <https://www.electrotraders.com.au/50mm-electrical-conduit-inspection-tee>.

* cited by examiner

*Primary Examiner* — Travis S Chambers
(74) *Attorney, Agent, or Firm* — Cramer Patent & Design, PLLC.; Aaron R. Cramer

(57) ABSTRACT

An electrical cable splicing device is a splicing system with integrated junction box for use with electrical power cabling. The device utilizes an overall body in the shape of a tee (T). Each distal edge of the tee is provided with a threaded coupling. The body is provided with internal busses that connect the three different connections (hot, neutral, and ground). The device also utilizes three connection fittings that attach to the three sections of cable. Each fitting is provided with three copper screw lugs that tighten onto each wire in each cable. Finally, the three connected fittings are attached into the tee body and tightened down with an exterior nut and a rubber boot and strain relief. During the tightening process, a solid connection is made to the internal busses, thus completing the connection. The device would be made in multiple sizes and types for use with different sizes of wire (American wire gauge (AWG)) as well as for use in different environments (National Electrical Manufacturers Association (NEMA)).

10 Claims, 5 Drawing Sheets

ELECTRICAL CABLE SPLICING DEVICE

RELATED APPLICATIONS

None.

FIELD OF THE DEVICE

The present device relates generally to a splicing device and more specifically to a splicing device for electrical cables.

BACKGROUND OF THE DEVICE

The presence of open-air splices is likely one of the electrical code infractions that is observed in the ordinary residential residence the most frequently. These kinds of splices are frequently discovered in the attic and the basement of a home. These are the sites where taps are made for new electrical loads such as light fixtures, outlets, and other electrical loads as the requirements of the property change over time. Arcing and the prospect of surrounding material, like wood, being set ablaze by the splices constitute a significant threat to public safety and pose a severe threat to public safety.

Because of this particular reason, such splices have to be made inside of a recognized junction box in order to prevent arcing from occurring. On the other hand, the installation of such boxes calls for a significant amount of expertise, ability, and possibly even specialist equipment. Even if one has all of these things, it will still take time, and time is a resource that is scarce, regardless of whether one is a professional electrician or a do-it-yourself electrician.

Because of this, there is a demand for a method that can be used to make splices in electrical power lines in a way that takes into account the issues that are occurring at the moment. This requirement has been met with the development of the electrical cable splicing device.

SUMMARY OF THE DEVICE

Embodiments of the present disclosure may include a splice body having a "T" shaped configuration and a splice body interior. Embodiments may also include a plurality of connection buses interconnected by a plurality of connection nodes with each end of the connection bus ending in a terminal cavity.

Embodiments may also include a splice body first male threaded end having a first grommet cavity. Embodiments may also include a splice body second male threaded end having a second grommet cavity. Embodiments may also include a splice body third male threaded end having a third grommet cavity. Embodiments may also include a first strain release nut having a cable aperture in communication with a first strain release nut female threaded interior and conical grommet.

Embodiments may also include a second strain release nut having a cable aperture in communication with a second strain release nut female threaded interior and conical grommet. Embodiments may also include a third strain release nut having a cable aperture in communication with a third strain release nut female threaded interior and conical grommet.

In some embodiments, the splice body provides physical protection, mechanical connection, and electrical connection for a plurality of electrical cables. In some embodiments, the splice body may include at least two separate splice body pieces joined together by splice body connecting hardware.

In some embodiments, the plurality of connection buses interconnected by a plurality of connection nodes with each end of the connection bus ending in a terminal cavity may be housed within the splice body interior.

In some embodiments, within each grommet cavity may be at least one terminal cavity and one connection bus. In some embodiments, a first cable having a plurality of exposed conducting wires may be passed through the first strain release nut cable aperture and conical grommet. In some embodiments, the first cable plurality of exposed conducting wires may be each individually secured within a corresponding terminal cavity between the corresponding connection bus.

In some embodiments, the first cable plurality of exposed conducting wires may be each individually secured within the connection bus by a terminal screw. In some embodiments, upon connection of each conducting wire to each connection bus the first strain release nut and conical grommet may be threadingly secured to the splice body first male threaded end with the conical grommet occupying the first grommet cavity.

In some embodiments, a second cable having a plurality of exposed conducting wires may be passed through the second strain release nut cable aperture and conical grommet. In some embodiments, the second cable plurality of exposed conducting wires may be each individually secured within a corresponding terminal cavity between the corresponding connection bus.

In some embodiments, the second cable plurality of exposed conducting wires may be each individually secured within the connection bus by a terminal screw. In some embodiments, upon connection of each conducting wire to each connection bus the second strain release nut and conical grommet may be threadingly secured to the splice body second male threaded end with the conical grommet occupying the second grommet cavity.

In some embodiments, a third cable having a plurality of exposed conducting wires may be passed through the third strain release nut cable aperture and conical grommet. In some embodiments, the third cable plurality of exposed conducting wires may be each individually secured within a corresponding terminal cavity between the corresponding connection bus.

In some embodiments, the third cable plurality of exposed conducting wires may be each individually secured within the connection bus by a terminal screw. In some embodiments, upon connection of each conducting wire to each connection bus the third strain release nut and conical grommet may be threadingly secured to the splice body third male threaded end with the conical grommet occupying the third grommet cavity.

In some embodiments, the first cable, second cable, and third cable may be in electrical communication each other having been each secured to the splice body. In some embodiments, the splice body and each strain relief nut may be made of materials such as stainless steel, aluminum, or plastic.

In some embodiments, the splice body interior may be lined with insulating materials when conductive materials may be used. In some embodiments, the cable splicing device has an approximate overall length of three to four inches suitable for residential branch wiring.

In some embodiments, the electrical cable splicing device may be suitable for use with various wire types (American wire gauge (AWG)) and in different environments (National Electrical Manufacturers Association (NEMA)). In some embodiments, the electrical cable splicing device may be compliant with USCG regulations for usage on marine vessels. In some embodiments, the conical grommet may be made of a rubber compound.

In some embodiments, the terminal cavities may be marked with indicia, specifying electrical connections or cable characteristics. In some embodiments, the electrical cable splicing device provides a watertight seal between the conical grommet and the electrical cables preventing dislodgment against lateral and shear moments.

In some embodiments, the splice body has an "I" shape when two electrical cables may be utilized. In some embodiments, the splice body has an "X" shape when four electrical cables may be utilized. In some embodiments, each of the strain release nuts may include an outer rubber pull back cover.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
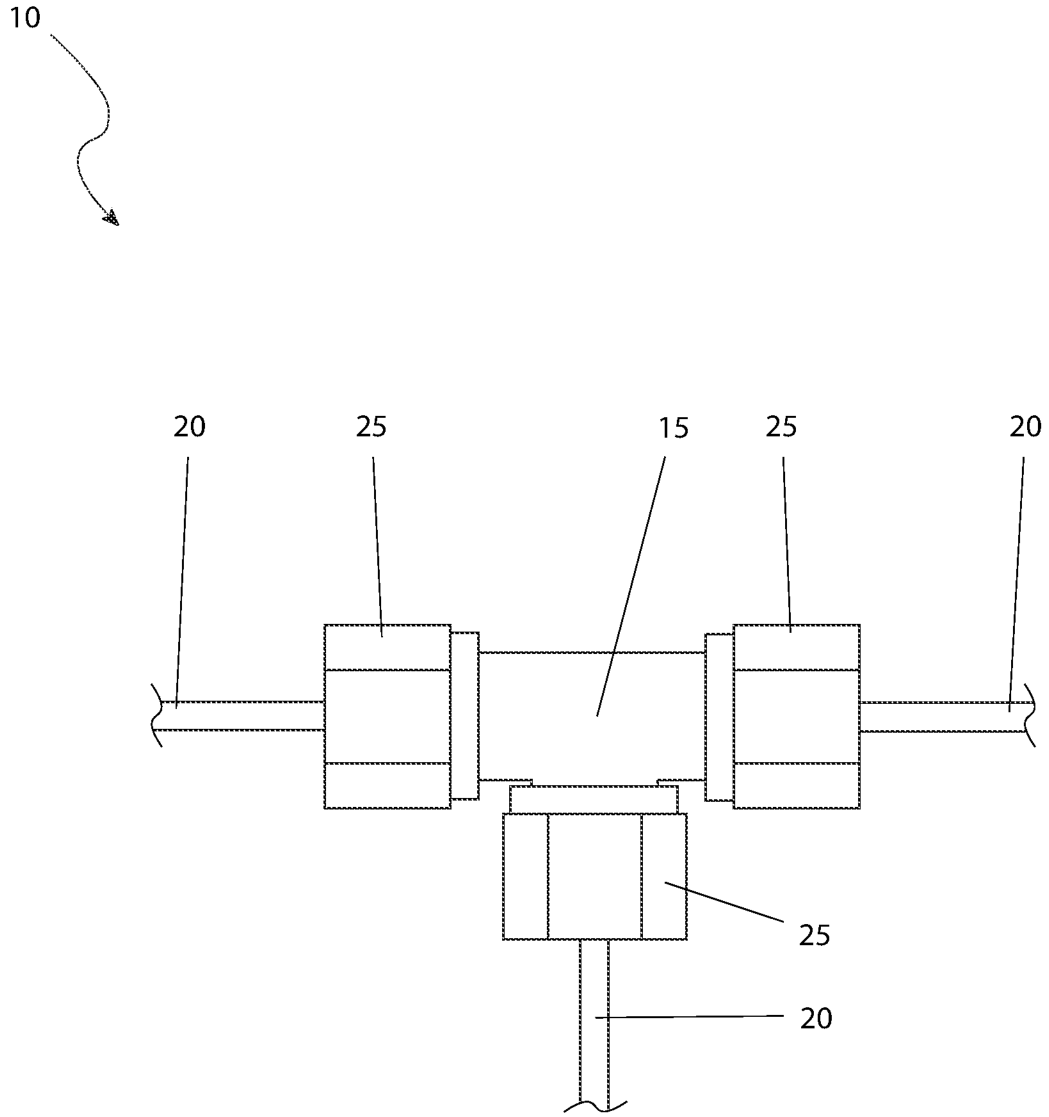
FIG. 1 is a front view of the electrical cable splicing device 10, shown in a utilized state, according to the preferred embodiment of the present invention.

10 electrical cable splicing device
15 splice body
20 electrical cable
25 strain relief nut
26 rubber pull back cover
30 interior opening
35 conical grommet
40 cable conductor
45 connecting hardware
50 grommet cavity
55 interior threads
60 exterior threads
65 connection bus
70 terminal cavity
75 terminal screw
80 connection node DESCRIPTION OF THE PREFERRED EMBODIMENTS The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Referring now to FIG. 1, a front view of the electrical cable splicing device 10, shown in a utilized state, according to the preferred embodiment of the present invention is disclosed. The electrical cable splicing device (herein also described as the "device") 10, provides for a self-contained physical splicing means for an electrical cable 20 which provides physical protection, a mechanical connection, and an electrical connection in a unitary assembly. The device 10 provides for at least two (1) electrical cables 20, herein shown as a quantity of three (3) for illustration. The quantity of electrical cables 20 will be at least (2) but may increase up to four (4) or more depending on the physical configuration of the device 10. The exact quantity of electrical cables 20 is not intended to be a limiting factor of the present invention. As the quantity of electrical cables 20 depicted in FIG. 1 is three (3), the overall shape of the splice body 15 is that of a "T". Should the quantity of electrical cables 20 be only two (2), the overall shape of the splice body 15 would be that of an "I". Should the quantity of electrical cables 20, be four (4), the overall shape of the splice body 15 would be that of an "X". As such, the overall shape of the splice body 15 will vary dependent on the quantity of the electrical cables 20.

Each electrical cable 20 enters through a strain relief nut 25, whose functionality will be described in greater detail herein below. The splice body 15 and the strain relief nut 25 may be made of a wide variety of materials such as stainless steel, aluminum, plastic, or the like. Should electrically conductive materials be utilized (such as aluminum), internal insulating materials such as plastic, Bakelite (Polyoxybenzylmethylenglycolanhydride), or the like would be utilized on the interior of the splice body 15. The actual size of the device 10 will vary per type and quantity of electrical cables 20, however, for a typical device 10 used for residential branch wiring, an approximate overall length of three to four inches (3-4 in.) is envisioned. It is envisioned that the device 10 would be suitable for use with all types of wire (American wire gauge (AWG)) as well as for use in different environments (National Electrical Manufacturers Association (NEMA). Usage may also be permitted on marine vessels in accordance with USCG regulations.

Figure 2:
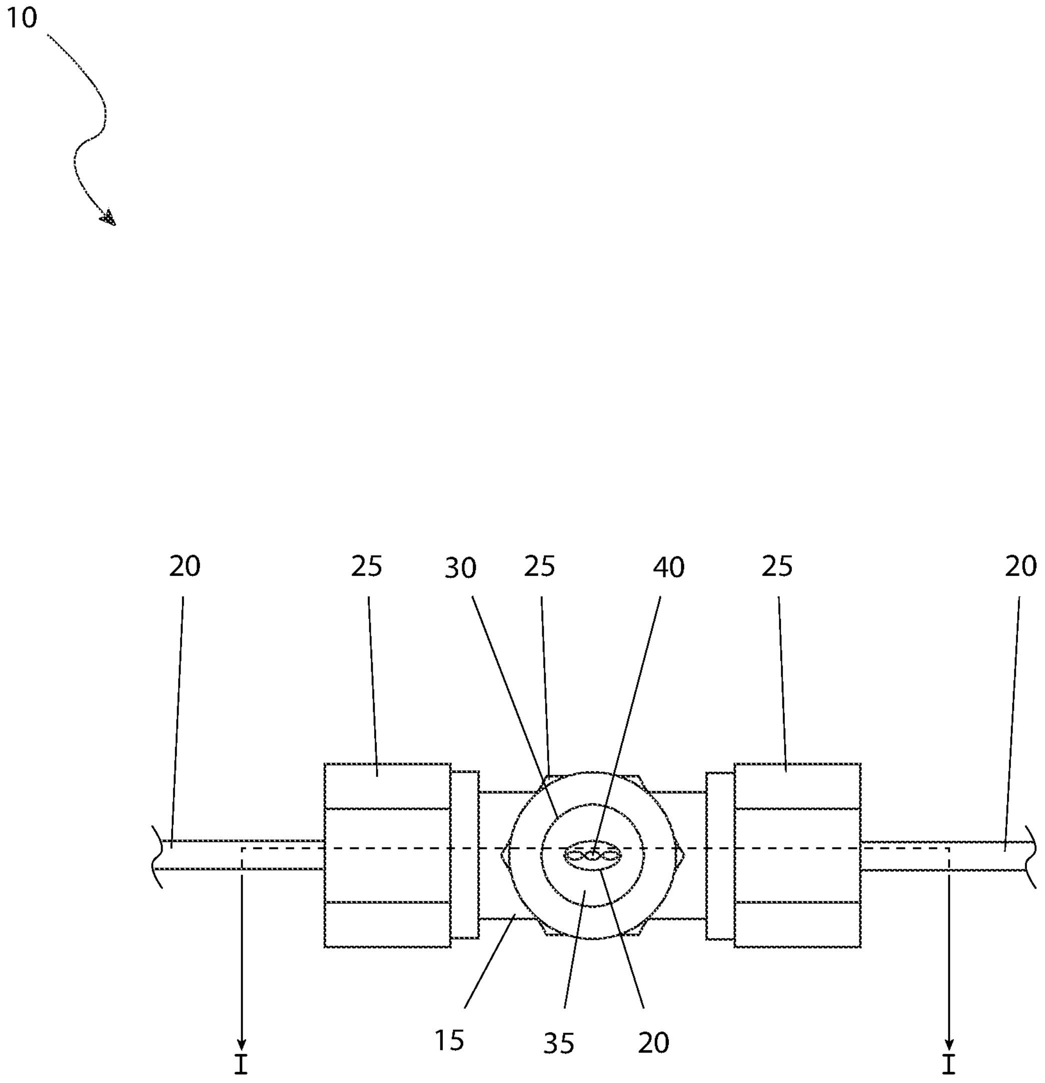
FIG. 2 is a bottom view of the electrical cable splicing device 10, shown in a utilized state, according to the preferred embodiment of the present invention.

Referring next to FIG. 2, a bottom view of the device 10, shown in a utilized state, according to the preferred embodiment of the present invention is depicted. The electrical cables 20 are shown entering the strain relief nut 25 through an interior opening 30 and into a conical grommet 35. The conical grommet 35 is envisioned to be made of a rubber compound. Further detail on the construction and functionality of the conical grommet 35 will be provided herein below. The interior of the electrical cables 20 are provided with one (1) or more cable conductors 40, as is typically expected. The electrical connection of each cable conductor 40 is joined to the other cable conductors 40 inside of the other electrical cable 20 in a near-zero resistance manner as will be described herein below.

Figure 3:
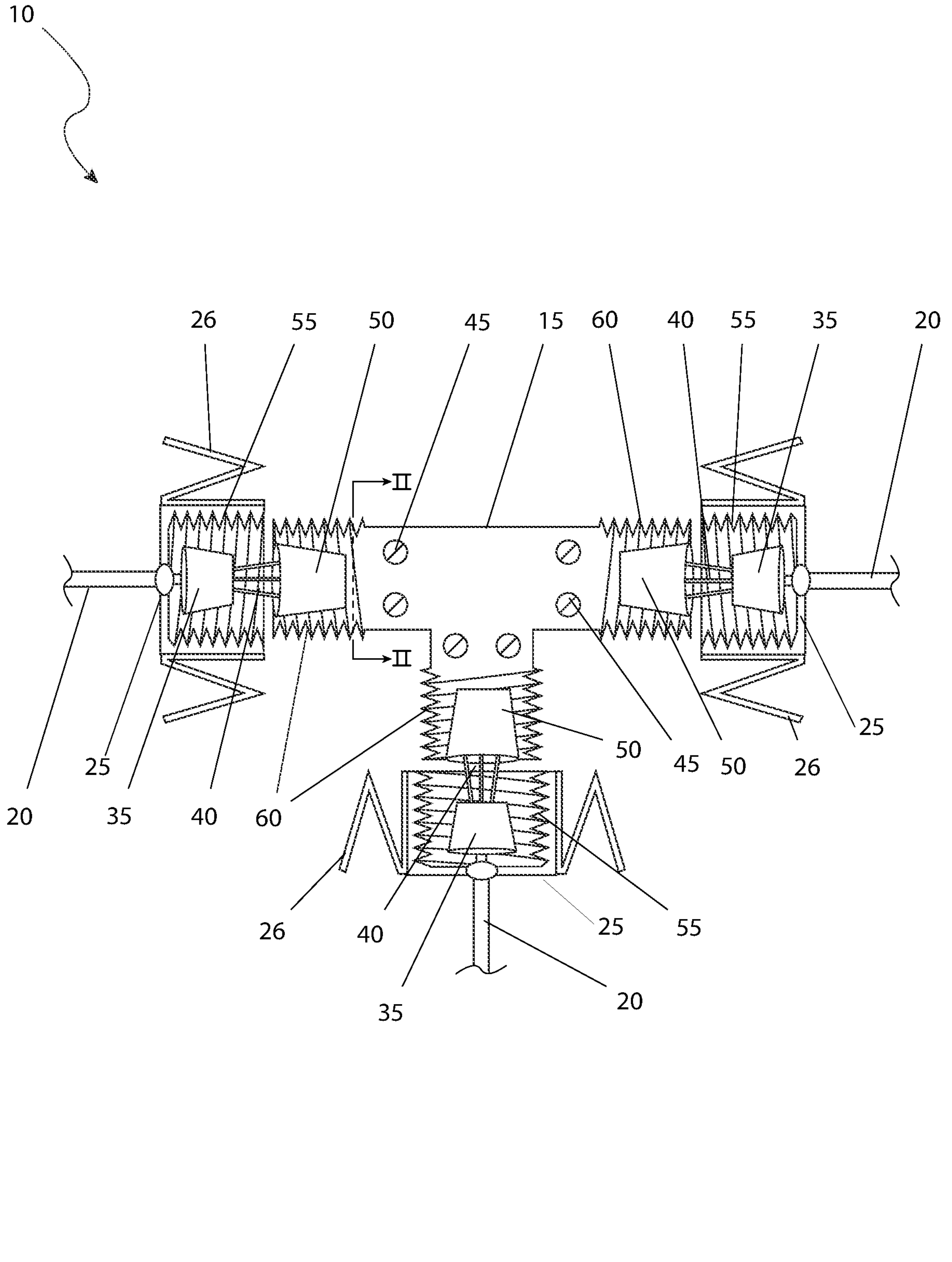
FIG. 3 is a sectional view of the electrical cable splicing device 10, as seen along a line I-I, as shown in FIG. 2, according to the preferred embodiment of the present invention.

Referring now to FIG. 3, a sectional view of the device 10, as seen along a line I-I, as shown in FIG. 2, according to the preferred embodiment of the present invention is shown. The strain relief nut 25, rubber pull back cover 26, and the conical grommet 35 are shown in a partially removed state for purposes of illustration. The splice body 15 may be provided in one (1), two (2), or more pieces, and are joined together by connecting hardware 45. The electrical cable 20 passes through an aperture of the strain relief nut 25, through into the conical grommet 35, through a grommet cavity 50, and into the splice body 15. When assembled, the conical grommet 35 is held captive in the grommet cavity 50 by the strain relief nut 25. The strain relief nut 25 is provided with interior threads 55 that mate with exterior threads 60 on the splice body 15. When tightened, the conical grommet 35 is squeezed by the grommet cavity 50 and forms a watertight seal against the electrical cable 20, as well as the grommet cavity 50. The rubber pull back cover 26 permits a user to further protect the connections of the device 10 from water or dust. This arrangement of the strain relief nut 25, the conical grommet 35, and the grommet cavity 50, provide for the physical and mechanical protection of the splice body 15, and prevent dislodgment of the electrical cable 20 from the device 10 against lateral and/or shear moments. In some embodiments, the strain relief nut 25 may be a cap (i.e., having no apertures for any electrical cable 20 to pass through) in the event that none is needed or desired (e.g., possible future expansion or splicing of electrical cables 20, decorative purposes, etc.).

Figure 4:
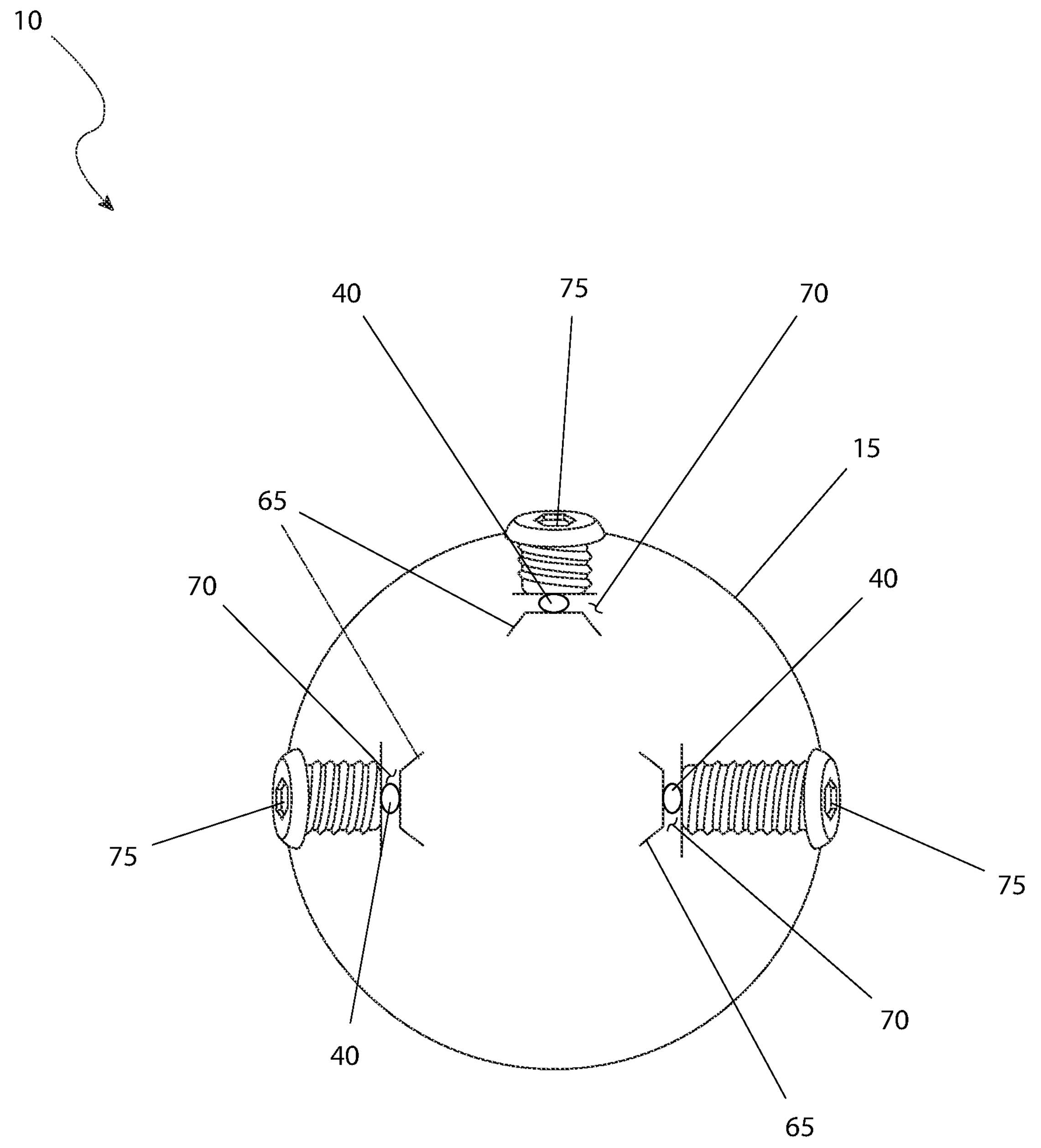
FIG. 4 is a sectional view of the electrical cable splicing device 10, as seen along a line II-II, as shown in FIG. 3, according to the preferred embodiment of the present invention; and, FIG. 5 is an electrical wiring diagram of the electrical cable splicing device 10, according to the preferred embodiment of the present invention.

Referring next to FIG. 4, a sectional view of the device 10, as seen along a line II-II, as shown in FIG. 3, according to the preferred embodiment of the present invention is disclosed. Multiple connection buses 65 are located on the interior of the splice body 15. The quantity of connection buses 65 will be equal to the number of cable conductors 40 in each electrical cable 20 (as shown in FIG. 2). The distal end of each connection bus 65 is provided with a terminal cavity 70 which holds the cable conductors 40 in a physical and electrical connection with the aid of a terminal screw 75. As such, each cable conductor 40 from each electrical cable 20, is mated to a common connection bus 65 in a parallel manner.

Figure 5:
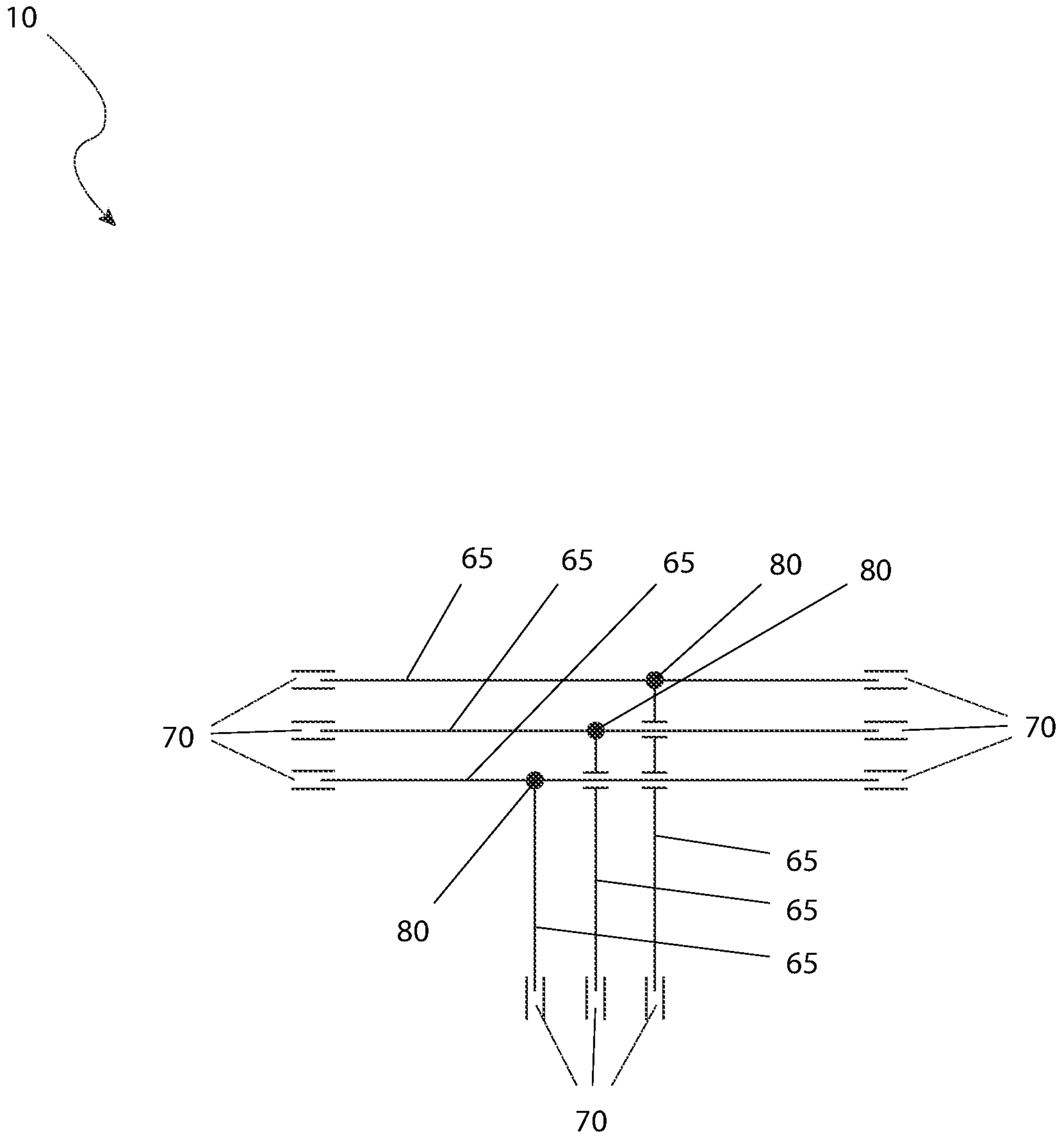

Referring to FIG. 5, an electrical wiring diagram of the device 10, according to the preferred embodiment of the present invention is depicted. Each of the connection buses 65 are connected in a parallel manner to each terminal cavity 70 at a connection node 80. It is noted that the number of the connection buses 65 are equal to the number of cable conductors 40 (as shown in FIG. 2), as aforementioned described. The minimum number of connection buses 65 would be one (1). The actual number of connection buses 65 may be two (2), three (3) (as shown), or even more. The various terminal cavities 70 may be marked with indicia, such as HOT, LINE, NEUTRAL, GROUND, RED, BLACK, WHITE, BLUE, GREEN, BROWN, ORANGE, YELLOW, or the like. The actual presence and type of indicia is not intended to be a limiting factor of the present invention.

2. OPERATION OF THE PREFERRED EMBODIMENT

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as hardware stores, home improvement stores, electrical supply houses, marine suppliers, mail order and internet supply houses and the like. Special attention would be paid to the overall materials of construction, type of electrical cables 20 being spliced, number of cable conductors 40 within the electrical cables 20, size (ampacity) of the electrical cables 20, area of use (normal, wet, hazardous, etc.), and the like.

After procurement, the device 10 power to the affected electrical cables 20 would be de-energized, the electrical cables 20 would be cut. All of the strain relief nuts 25 and conical grommets 35 would be removed from the device 10 and placed over the respective ends of the electrical cables 20. The outer jacket of the electrical cables 20 would be removed. The insulation from each cable conductor 40 would be removed. The cable conductors 40 would be placed into the respective terminal cavity 70 and the terminal screw 75 tightened to an appropriate torque. A conical grommet 35 would be slid back down each electrical cables 20 and into the grommet cavity 50. A strain relief nut 25 would be slid back down each electrical cables 20 and the interior threads 55 on the strain relief nut 25 would be engaged with the exterior threads 60 on the splice body 15. The above actions would be repeated as required for each electrical cable 20. At this point in time, the electrical power would be re-energized placing the branch circuit as well as the new splice branch circuit back into service.

It is envisioned that the features of the device 10 provide the following benefits: the ability to add a receptacle or wiring device to an existing electrical circuit without the need for a dedicated junction box or pulling excess cable conductors 40 to reach the connection point; more time saving than installing a separate junction box and separate splicing means; the ability to add a splice in areas without any slack in the cable conductors 40; and, improved weather and moisture resistance.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An electrical cable splicing device comprising:

a splice body having a "T" shaped configuration and a splice body interior;

a plurality of connection buses interconnected by a plurality of connection nodes with each end of the connection bus ending in a terminal cavity;

a splice body first male threaded end having a first grommet cavity;

a splice body second male threaded end having a second grommet cavity;

a splice body third male threaded end having a third grommet cavity;

a first strain release nut having a cable aperture in communication with a first strain release nut female threaded interior and conical grommet;

a second strain release nut having a cable aperture in communication with a second strain release nut female threaded interior and conical grommet; and, a third strain release nut having a cable aperture in communication with a third strain release nut female threaded interior and conical grommet; and, wherein the splice body provides physical protection, mechanical connection, and electrical connection for a plurality of electrical cables;

wherein the splice body may comprise at least two separate splice body pieces joined together by splice body connecting hardware;

wherein the plurality of connection buses interconnected by a plurality of connection nodes with each end of the connection bus ending in a terminal cavity are housed within the splice body interior;

wherein within each grommet cavity is at least one terminal cavity and one connection bus;

wherein a first cable having a plurality of exposed conducting wires is passed through the first strain release nut cable aperture and conical grommet;

wherein the first cable plurality of exposed conducting wires is each individually secured within a corresponding terminal cavity between the corresponding connection bus;

wherein the first cable plurality of exposed conducting wires is each individually secured within the connection bus by a terminal screw;

wherein upon connection of each conducting wire to each connection bus the first strain release nut and conical grommet are threadingly secured to the splice body first male threaded end with the conical grommet occupying the first grommet cavity;

wherein a second cable having a plurality of exposed conducting wires is passed through the second strain release nut cable aperture and conical grommet;

wherein the second cable plurality of exposed conducting wires is each individually secured within a corresponding terminal cavity between the corresponding connection bus;

wherein the second cable plurality of exposed conducting wires is each individually secured within the connection bus by a terminal screw;

wherein upon connection of each conducting wire to each connection bus the second strain release nut and conical grommet are threadingly secured to the splice body second male threaded end with the conical grommet occupying the second grommet cavity;

wherein a third cable having a plurality of exposed conducting wires is passed through the third strain release nut cable aperture and conical grommet;

wherein the third cable plurality of exposed conducting wires is each individually secured within a corresponding terminal cavity between the corresponding connection bus;

wherein the third cable plurality of exposed conducting wires is each individually secured within the connection bus by a terminal screw;

wherein upon connection of each conducting wire to each connection bus the third strain release nut and conical grommet are threadingly secured to the splice body third male threaded end with the conical grommet occupying the third grommet cavity; and, wherein the first cable, second cable, and third cable are in electrical communication each other having been each secured to the splice body.

2. The electrical cable splicing device of claim 1, wherein said cable splicing device has an approximate overall length of three to four inches suitable for residential branch wiring.

3. The electrical cable splicing device of claim 1, wherein the electrical cable splicing device is suitable for use with various wire types (American wire gauge (AWG)) and in different environments (National Electrical Manufacturers Association (NEMA)).

4. The electrical cable splicing device of claim 1, wherein the electrical cable splicing device is compliant with USCG regulations for usage on marine vessels.

5. The electrical cable splicing device of claim 1, wherein the conical grommet is made of a rubber compound.

6. The electrical cable splicing device of claim 1, wherein the terminal cavities are marked with indicia, specifying electrical connections or cable characteristics.

7. The electrical cable splicing device of claim 1, wherein the electrical cable splicing device provides a watertight seal between the conical grommet and the electrical cables preventing dislodgment against lateral and shear moments.

8. The electrical cable splicing device of claim 1, wherein each of the strain release nuts comprises an outer rubber pull back cover.

9. The electrical cable splicing device of claim 1, wherein the splice body and each strain relief nut are made of materials such as stainless steel, aluminum, or plastic.

10. The electrical cable splicing device of claim 9, wherein the splice body interior is lined with insulating materials when conductive materials are used.

* * * * *